United States Patent [19]
Arika et al.

[11] Patent Number: 4,650,654
[45] Date of Patent: * Mar. 17, 1987

[54] PROCESS FOR PREPARATION OF FERRIERITE TYPE ZEOLITES

[75] Inventors: Junji Arika, Tokuyama; Hiroshi Miyazaki, Shinnanyo; Kazushige Igawa, Shinnanyo; Keiji Itabashi, Shinnanyo, all of Japan

[73] Assignee: Toyo Soda Manufacturing Co., Ltd., Shinnanyo, Japan

[*] Notice: The portion of the term of this patent subsequent to Jul. 23, 2002 has been disclaimed.

[21] Appl. No.: 686,409

[22] Filed: Dec. 26, 1984

Related U.S. Application Data

[63] Continuation-in-part of Ser. No. 534,118, Sep. 20, 1983, Pat. No. 4,562,055.

[30] Foreign Application Priority Data

Sep. 20, 1982 [JP] Japan ............... 57-162123
Oct. 8, 1982 [JP] Japan ............... 57-176077
Dec. 27, 1983 [JP] Japan ............... 58-244798

[51] Int. Cl.$^4$ ............................. C01B 33/28
[52] U.S. Cl. ......................... 423/328; 423/118; 423/329; 423/330; 502/60; 502/77
[58] Field of Search ............... 423/328–330, 423/118, 328 C; 502/60, 77

[56] References Cited

U.S. PATENT DOCUMENTS

| | | | |
|---|---|---|---|
| 3,574,539 | 4/1971 | Domine et al. | 423/328 |
| 3,933,974 | 1/1976 | Winquist | 423/329 |
| 3,966,883 | 6/1976 | Vaughan et al. | 423/328 |
| 4,017,590 | 4/1977 | Cormier et al. | 423/328 |
| 4,046,859 | 9/1977 | Plank et al. | 423/329 |
| 4,530,824 | 7/1985 | Arika et al. | 423/329 |

FOREIGN PATENT DOCUMENTS 1119962 7/1962 United Kingdom ............... 423/329

OTHER PUBLICATIONS

Kibby et al, "Journal of Catalyst", 35, 1974, pp. 256–277.

Primary Examiner—John Doll
Assistant Examiner—Jackson Leeds
Attorney, Agent, or Firm—Cushman, Darby & Cushman

[57] ABSTRACT

A ferrierite type zeolite having a high purity and a high $SiO_2/Al_2O_3$ molar ratio is prepared by reacting simultaneously and continuously an aqueous sodium and/or potassium silicate solution with an aluminum-containing solution to obtain a homogeneous phase compound of a granular amorphous aluminosilicate containing Al in an amount of 3 to 14 wt. % as calculated as anhydrous $Al_2O_3$ and Na and/or K in an amount of 1 to 17 wt. % as calculated as anhydrous $Na_2O$ and/or $K_2O$; and then, crystallizing the homogeneous phase compound in the form of a slurry in water or in an aqueous sodium hydroxide and/or potassium hydroxide solution. The molar ratio of $K^+$ to the total of $(K^+ + N^+)$ in the slurry is 0.1 to 0.9.

7 Claims, 3 Drawing Figures

PROCESS FOR PREPARATION OF FERRIERITE TYPE ZEOLITES

CROSS-REFERENCE TO RELATED APPLICATION

This is a continuation-in-part of application Ser. No. 534,118 filed on Sept. 20, 1983 now U.S. Pat. No. 4,562,055.

BACKGROUND OF THE INVENTION (1) Field of the Invention

The present invention relates to a process for preparing a ferrierite type zeolite. More particularly, it relates to a process for preparing a ferrierite type zeolite whereby a ferrierite type zeolite having a high purity and a high $SiO_2/Al_2O_3$ molar ratio is prepared easily with a good reproducibility without using an organic or inorganic mineralizing agent.

(2) Description of the Related Art

Zeolite is a crystalline aluminosilicate containing zeolitic water, as is apparent from the fact that the origin of the word "zeolite" is a Greek word "Zein" which means "boiling stone", and zeolite is generally represented by the following empirical formula:

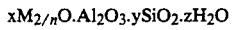
$xM_{2/n}O.Al_2O_3.ySiO_2.zH_2O$ wherein n stands for the valency of the cation M, x is a number of from 0.8 to 2, y is a number of at least 2, and z is a number of at least 0.

The basic structure of the zeolite comprises $SiO_4$ tetrahedrons containing silicon at the center and four oxygen atoms at the apexes and $AlO_4$ tetrahedrons containing aluminum at the center instead of silicon, in which the tetrahedrons are regularly three-dimensionally bonded together while owning oxygen atoms in common, so that the O/(Al+Si) atomic ratio is 2. Accordingly, there is formed a three-dimensional network structure having pores differing in the size and shape according to the difference of the manner of bonding of tetrahedrons.

The negative charges of the $AlO_4$ tetrahedrons are electrically neutralized by coupling with cations such as alkali metal or alkaline earth metal ions.

The thus-formed fine pores generally have a size from 2 to 3 angstroms to ten-odd angstroms and the size of the fine pores can be changed by exchanging metal cations bonded to the $AlO_4$ tetrahedrons with other metal cations having a size or valency different from that of the bonded metal cations.

By utilizing these fine pores, the zeolite is used as an industrial dehydrator for a gas or liquid or as a molecular sieve for adsorbing and separating specific molecules from mixtures containing at least two kinds of molecules. Furthermore a product obtained by exchanging the metal cations with hydrogen ions acts as a solid acid, and is used as an industrial catalyst for various purposes by utilizing the property as the solid catalyst.

A ferrierite type zeolite is naturally produced, and its typical composition is represented as follows:

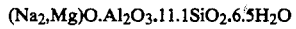
$(Na_2,Mg)O.Al_2O_3.11.1SiO_2.6.5H_2O$

The crystal structure of the zeolite comprises 5-membered oxygen ring units constituting the skeleton, and is characterized in that it has fine pores of 10-membered oxygen rings having a size of 4.3×5.5 angstroms and fine pores of 8-membered oxygen rings having a size of 3.4×4.8 angstroms.

Various processes as described below have been proposed for synthesizing ferrierite type zeolites. However, an industrially satisfactory process has not been developed yet.

(1) In the process proposed by C. L. Kibby et al (Journal of Catalysts, Vol. 35, pages 256-272, 1974), a high temperature exceeding about 300° C. is necessary for crystallization, and therefore, a high-temperature high-pressure type reaction vessel must inevitably be used.

(2) In the process disclosed in Japanese Unexamined Patent Publication No. 51-106700, the synthesis can be carried out at a relatively low temperature, but a starting silica-alumina material having a specific composition should be used and the presence of a potassium ion in the reaction system is indispensable. Moreover, addition of a mineralizing agent in the form of a potassium salt of a specific organic or inorganic polybasic acid is indispensable. Thus, in this process, selection of the starting materials and setting of the reaction conditions are complicated.

(3) In the process disclosed in Japanese Unexamined Patent Publications Nos. 50-127898 and No. 55-85415, use of N-methylpyridine hydroxide and piperidine and/or an alkyl-substituted piperidine as an organic mineralizing agent is indispensable. These organic amines are expensive, and since these organic amines are included in the formed zeolite, when the ferrierite type zeolite obtained according to this process is used as an adsorbent or catalyst, it is necessary to calcine the once-synthesized zeolite at a high temperature exceeding 500° C. in the presence of oxygen to remove the amines. Namely, when the zeolite is used for these specific purposes, the zeolite should be subjected to a preliminary treatment as described above.

(4) The process disclosed in Japanese Unexamined Patent Publication No. 53-144500 is a process for synthesizing a ferrierite type zeolite called "ZSM-35", in which butane diamine or an organic base-containing cation derived therefrom is used. As in the above-mentioned process (3), the zeolite obtained by the synthesis should be subjected to a preliminary treatment before it is used in various fields.

It is known that in zeolites comprising 5-membered oxygen rings as the zeolite skeleton-constituting units, such as ferrierite, mordenite and ZSM-5, the $SiO_2/Al_2O_3$ molar ratio can be increased to a relatively high level. However, for the synthesis of these zeolites, it is ordinarily indispensable that an organic nitrogen-containing compound or other organic compounds should be added to the reaction system, as pointed out hereinbefore. Furthermore, in these known processes, in order to enhance the activity of the reaction mixture, expensive aqueous colloidal silica is ordinarily used as the silica source.

SUMMARY OF THE INVENTION

It is the primary object of the present invention to provide a process in which a ferrierite type zeolite having a high purity and a high $SiO_2/Al_2O_3$ molar ratio is easily prepared with a good reproducibility by crystallizing a homogeneous phase compound of a granular amorphous aluminosilicate having a specific composition in water or an aqueous solution of an alkali metal hydroxide without using organic and inorganic mineralizing agents customarily used and without using expensive aqueous colloidal silica as the silica source.

In accordance with the present invention, there is provided a process for preparing ferrierite type zeolites, which comprises the steps of:

reacting an aqueous solution of an alkali metal silicate simultaneously and continuously with an aluminum-containing aqueous solution to obtain a homogeneous phase compound of a granular amorphous aluminosilicate containing aluminum in an amount of 3 to 14% by weight as calculated as anhydrous $Al_2O_3$ and an alkali metal in an amount of 1 to 17% by weight as calculated as anhydrous $A_2O$ wherein A is a metal selected from the group consisting of sodium and potassium; and then, crystallizing the homogeneous phase compound of the granular amorphous aluminosilicate in the form of a slurry in water or in an aqueous solution of an alkali metal hydroxide selected from the group consisting of sodium hydroxide and potassium hydroxide; the molar ratio of potassium ions ($K^+$) to the total alkali metal cations ($K^+ + Na^+$) in said slurry being in the range of from 0.1 to 0.9.

DESCRIPTION OF THE PREFERRED EMBODIMENTS

Figure 1:
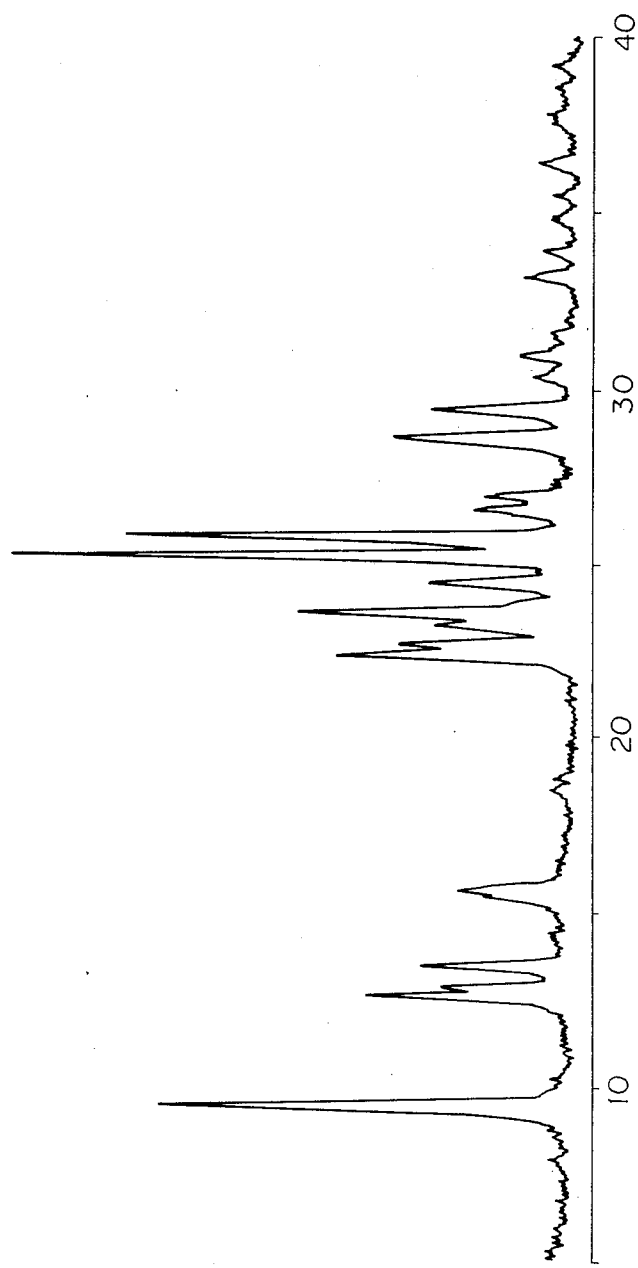
FIG. 1 is an X-ray powder diffraction diagram of the ferrierite type zeolite obtained in Example 1.

In the first step, a homogeneous phase compound of a granular amorphous aluminosilicate (hereinafter referred to as "homogeneous compound" for brevity) having a specific composition is prepared by reacting simultaneously and continuously an aqueous solution of an alkali metal silicate with an aluminum-containing aqueous solution. By the term "simultaneous and continuously" herein referred to is meant that the reaction is carried out in such a manner that the aqueous solution of an alkali metal silicate and the aluminum-containing aqueous solution are simultaneously supplied to a reaction zone in a continuous manner, while always maintaining the same ratio. It is preferred that the reaction mixture is continuously removed from the reaction zone at a substantially constant rate.

As the aqueous solution of the alkali metal silicate, there can be used aqueous solutions of sodium silicate and potassium silicate, and mixtures thereof. As the aluminum-containing aqueous solution, there can be used aqueous solutions of aluminum sulfate, aluminum nitrate, aluminum chloride, sodium aluminate and potassium aluminate. If necessary, a caustic alkali or mineral acid may be added to these aqueous solutions so as to adjust the amount of the alkali or acid. A commercially available aqueous solution of an alkali metal silicate and a commercially available aqueous solution of a mineral acid salt of aluminum or an alkali metal aluminate may be used as the starting aqueous solutions. Furthermore, an aqueous solution formed by dissolving a silica source such as siliceous sand or hydrous solid silicic acid by a caustic alkali and an aqueous solution formed by dissolving an aluminum source such as aluminum hydroxide or activated alumina by a mineral acid or a caustic alkali may be used. The concentrations of both the aqueous solutions are not practically critical, but optional concentrations may be adopted.

According to a preferred embodiment of the production of the homogeneous compound by the above-mentioned process, both the aqueous solutions are simultaneously and continuously supplied with stirring to an overflow type reaction vessel provided with a stirrer. The homogeneous compound obtained according to this embodiment takes the shape of substantially spherical particles or agglomerates of fine particles, and the particle size of the majority of the particles is distributed in the range of from 1 to 500 $\mu$m and the fraction of fine particles having a particle size smaller than 1 $\mu$m is very small. Accordingly, this embodiment is especially effective. In carrying out the present invention, it is preferred that a homogeneous compound having a particle size of 10 to 100 $\mu$m be used. The feed rates of both the aqueous solutions can optionally be determined according to the intended $SiO_2/Al_2O_3$ molar ratio of the ferrierite type zeolite.

A slurry containing the granular homogeneous compound suspended therein is formed by the above reaction. The pH value of this slurry is adjusted by controlling the amounts of the alkali and acid to be added to both the aqueous solutions. It is ordinarily preferred that the pH value of the reaction slurry be adjusted to 5 to 9, more preferably 6 to 8.

The residence time of the slurry in the reaction vessel is preferably at least 3 minutes. By the term "residence time" referred to herein is meant a period ranging from the point of the simultaneous and continuous supply of both the aqueous solutions to the reaction vessel to the point of the discharge of the reaction slurry containing the homogeneous compound formed by the reaction from the reaction vessel. If the residence time is shorter than 3 minutes, the ratio of formation of fine particles is increased. As described hereinafter, as the ratio of fine particles having a size smaller than 1 $\mu$m is increased, a larger load is imposed at the step of filtering and separating the formed compound. If the residence time is at least 3 minutes, the majority of formed particles are spherical particles, and the proportion of fine particles is reduced. If the residence time is further prolonged, the particle size becomes larger and the bonding among the particles becomes strong, resulting in increase of the hardness of the formed spherical particles. Accordingly, the size and hardness of the formed spherical particles can be changed by controlling the residence time, and the reactivity of the homogeneous compound, per se, can therefore be adjusted by controlling the residence time.

The reaction temperature adopted for the production of the homogeneous compound is not particularly critical, and spherical particles are formed at either a low temperature or a high temperature and no substantial difference of the reactivity is caused by the difference in the reaction temperature.

The characteristic fact involved in the present invention is that when both the aqueous solutions having the concentrations thereof adjusted are simultaneously and continuously reacted at a constant ratio, the composition of the formed spherical homogeneous compound is microscopically completely uniform, irrespective of the size of the formed spherical particles, and formation of impurities as by-products owing to the non-uniform composition can be prevented.

If the reaction is carried out by adding one aqueous solution to the other aqueous solution according to the so-called batchwise method, the viscosity of the reaction slurry is abnormally increased, and even if strong stirring is effected, it is impossible to render the formed slurry homogeneous. Even if the slurry is sufficiently mixed and seems to be rendered homogeneous, microscopic non-uniformity of the composition cannot be avoided.

Since the homogeneous compound of the present invention consists of spherical particles having a size of 1 to 500 μm, the viscosity of the reaction slurry is very low and the strong stirring required in the above-mentioned batchwise method need not be effected, and the concentration of the reaction slurry can be greatly increased.

The homogeneous compound prepared according to the process of the present invention is in the form of spherical particles having an appropriate size, and solid-liquid separation and washing can be performed very easily. Accordingly, an ordinary centrifugal separator or vacuum filter can be adopted for solid-liquid separation. Moreover, since the dehydrating property is very good and the compound is obtained in the form of a wet cake having a low water content, in preparing a reaction mixture for crystallization to the ferrierite type zeolite, the amount of water can be set within a very broad range. It is preferred that the washed homogeneous compound be used in the form of a wet cake. Of course, however, the homogeneous compound may be used after drying.

In the process for preparing a ferrierite type zeolite according to the present invention, crystallization is effected in a mixed ion system comprising sodium and potassium ions, and this process is characterized in that a mineralizing agent containing these ions is not used at all. In the case where the synthesis is carried out in the system containing sodium ions alone as the cations, the zeolite-forming region is very narrow and the change of the $SiO_2/Al_2O_3$ molar ratio is small. Moreover, a long crystallization time is necessary at a relatively high temperature.

In contrast, in the process of the present invention where crystallization is effected in the mixed ion system comprising sodium and potassium ions, the zeolite-forming region is much broadened and a ferrierite type zeolite having a high purity and an $SiO_2/Al_2O_3$ molar ratio of from 12 to 24 can be stably obtained. Moreover, the crystallization is completed at a lower temperature within a shorter time than in the system containing sodium ions alone.

The homogeneous compound obtained according to the process of the present invention has a cation exchange property. According to another characteristic feature of the present invention, the homogeneous compound ion-exchanged by utilizing this property can be used as the starting material for the synthesis of a ferrierite type zeolite.

In the case where sodium ions alone are present as the metal cations in the reaction system for the preparation of the homogeneous compound, the cations included in the formed homogeneous compound are sodium ions only. In the case where potassium ions alone are present as the metal cations in the system, the cations in the formed homogeneous compound are potassium ions only. In carrying out the present invention, each of the foregoing homogeneous compounds can be used. Moreover, since the cations thus included in the homogeneous compound can be easily ion-exchanged, sodium ions in the homogeneous compounds can be exchanged with potassium ions or potassium ions may be exchanged with sodium ions, or these ions can be converted to a mixture of sodium ions and potassium ions.

The ion exchange can be easily performed, for example, by immersing the homogeneous compound in an aqueous solution containing sodium ions and/or potassium ions. A sodium salt and/or a potassium salt of an inorganic acid or an organic acid can ordinarily be used for the aqueous solution containing sodium ions and/or potassium ions. The ion exchange is reversible, and the equilibrium exchange ratio is determined depending upon the amount of sodium ions and/or potassium ions present in the aqueous solution used for the ion exchange and upon the amount of the homogeneous compound. The homogeneous compound is further characterized in that the rate of ion exchange reaction is very high.

In carrying out the present invention, since the molar ratio of the potassium ions to the total cations in the whole reaction mixture is limited within a certain range, use of an ion-exchanged homogeneous compound is sometimes advantageous, and the ion exchange property of the homogeneous compound is effectively utilized in this case.

In general, the mixing ratio of the ingredients of the starting material is very important for preparing a pure zeolite free of impurities.

In the present invention, the composition of the homogeneous compound is determined by the kinds of the aqueous solution of the alkali metal silicate and the aluminum-containing aqueous solution, to be used for the production of the homogeneous compound, the reaction conditions and the filtering, washing and drying conditions. Furthermore, if ion exchange is carried out according to need the composition is also influenced by the ion exchange conditions.

The composition of the homogeneous compound used for the production of a high-purity ferrierite type zeolite in the process of the present invention will now be described. The homogeneous compound contains aluminum in an amount of 3 to 14% by weight an calculated as anhydrous $Al_2O_3$ and an alkali metal in an amount of 1 to 17% by weight as calculated as anhydrous $A_2O$. It is preferred that the aluminum content be 4 to 12% by weight as $Al_2O_3$ and the alkali metal content be 1.5 to 15% by weight as $A_2O$. The alkali metal is sodium and/or potassium.

If a homogeneous compound having an anhydrous $Al_2O_3$ content lower than 3% by weight is used, other zeolites are formed as impurities in large quantities. If the anhydrous $Al_2O_3$ content exceeds 14% by weight, a ferrierite type zeolite is not formed. If the alkali metal content is outside the above-mentioned range, the obtained product contains large quantities of impurities.

The thus-obtained homogeneous compound is heated in water or an aqueous solution of an alkali metal hydroxide to effect crystallization of the homogeneous compound into a ferrierite type zeolite.

In preparing a reaction mixture for crystallization by adding a predetermined amount of a homogeneous compound having a known composition to water or an aqueous solution of an alkali metal hydroxide, the concentration and amount of water or the aqueous solution of the alkali metal hydroxide and the mclar ratio of potassium ions to the total cations contained in the reaction mixture should be adjusted so that the homogeneous compound will be crystallized into a high-purity ferrierite type zeolite.

As the aqueous solution of the alkali metal hydroxide to be used for crystallization of the homogeneous compound in the present invention, there can be mentioned aqueous solutions of sodium hydroxide, potassium hydroxide and a mixture thereof. The concentration of the aqueous solution of the alkali metal hydroxide is adjusted according to the aluminum content in the homogeneous compound, as indicated below.

|  | Applicable Range (% by weight) | Preferred Range (% by weight) |
|---|---|---|
| Aluminum Content (as Al$_2$O$_3$) in Homogeneous Compound | 3–14 | 4–12 |
| Concentration of Aqueous Solution of Alkali Metal Hydroxide (AOH) | 0–13 | 0–11 |

In the above table, AOH represents NaOH and/or KOH.

In the process of the present invention, the most preferred conditions for obtaining a ferrierite type zeolite having a high purity and a high crystallinity are such that the condition shown in the above table is satisfied, the molar ratio of the alkali metal hydroxide component as AOH in the slurry to the silicon component SiO$_2$ in the homogeneous compound is adjusted within a range of from 0.1 to 0.35, especially from 0.15 to 0.3, and the molar ratio of potassium ions to the total cations contained in the reaction mixture is adjusted within a range of from 0.1 to 0.9, especially from 0.2 to 0.7.

Furthermore, the amount of water or the aqueous solution of the alkali metal hydroxide is adjusted so that the weight ratio of the solids to the whole starting slurry for crystallization is within a range of from 0.04 to 0.4.

As pointed out hereinbefore, the homogeneous compound obtained according to the typical embodiment of the present invention has a relatively large particle size and a high hardness. Accordingly, the homogeneous compound is not finely divided even under stirring. Therefore, the amount of water in the starting slurry can be reduced within a range not forming impurities without drastic increase of the viscosity of the slurry, and hence, the yield in the batchwise reaction can remarkably be increased.

In the present invention, crystallization is effected by charging a starting homogeneous compound-containing slurry for crystallization in an autoclave and heating the slurry at a temperature of 100° to 300° C., preferably at least 150° C. In order to uniformalize the temperature in the autoclave during the crystallization, it is preferred that the crystallization be carried out with stirring. After completion of the crystallization, the formed crystal is separated from the mother liquor, washed with water and dried to obtain a crystal powder. The obtained crystal particles retain substantially the same particle size as that of the spherical particles of the starting homogeneous compound. Namely, the obtained product is an aggregate of crystal particles of a ferrierite type zeolite, and having a particle size of about 1 to about 500 μm.

The ferrierite type zeolite prepared according to the present invention is ion-exchanged with an appropriate cation, if necessary, and is used as an adsorbent or catalyst as in the form of the crystal aggregate or after fine pulverization or after molding together with a binder.

The present invention will now be described in detail with reference to the following examples.

[Preparation of Homogeneous Compound]

An aqueous solution of sodium silicate having a composition shown in Table 1 and a sulfuric acid-added aqueous solution of aluminum sulfate shown in Table 1 were simultaneously and continuously supplied at constant feed rates shown in Table 1 in an overflow type reaction vessel having an actual capacity of 5.5 l provided with an ordinary paddle type agitator. Both reactants were reacted with stirring. The apparent residence time of the reaction slurry was as shown in Table 1.

The pH value of the slurry was 6.3 to 6.6 and the reaction temperature was 30° to 32° C.

The product slurry overflowing from the reaction vessel was subjected to solid-liquid separation by using a centrifugal separator, and the recovered solid was washed with water. Thus, wet cakes of homogeneous compounds A through H having a composition shown in Table 1 were prepared. The presence of SO$_4$ ions was not observed in any of these homogeneous compounds. From the results of the X-ray powder diffractometry, it was confirmed that these homogeneous compound were amorphous.

The thus-prepared homogeneous compound wet cake C, G or H and an aqueous solution of potassium chloride were charged in a separable flask having a capacity of 2 l, and the mixture was stirred at room temperature for 18 hours to effect potassium ion exchange. The amount of the homogeneous compound used and the concentration and amount of potassium chloride were as shown in Table 2. After completion of the ion exchange, the formed slurry was subjected to solid-liquid separation and washed sufficiently with water. Thus, wet cakes of homogeneous compounds I through K having a composition shown in Table 2 were obtained. The presence of Cl ions was not observed in any of these homogeneous compounds. From the results of the X-ray powder diffractometry, it was confirmed that each of the homogeneous compounds was amorphous.

EXAMPLES 1 THROUGH 7 AND COMPARATIVE EXAMPLES 1 THROUGH 3

The thus-prepared homogeneous compound cake and an aqueous solution of an alkali metal hydroxide were charged in an autoclave having a capacity of 2 l or 10 l, and the mixture was heated with stirring. Then, the formed slurry was taken out from the autoclave, subjected to solid-liquid separation, washed sufficiently with water and then dried at 110° C. The crystallization conditions and the obtained results are shown in Table 3. The products were determined by X-ray powder diffraction diagrams (measured by using a Kα doublet of copper).

Figure 2:
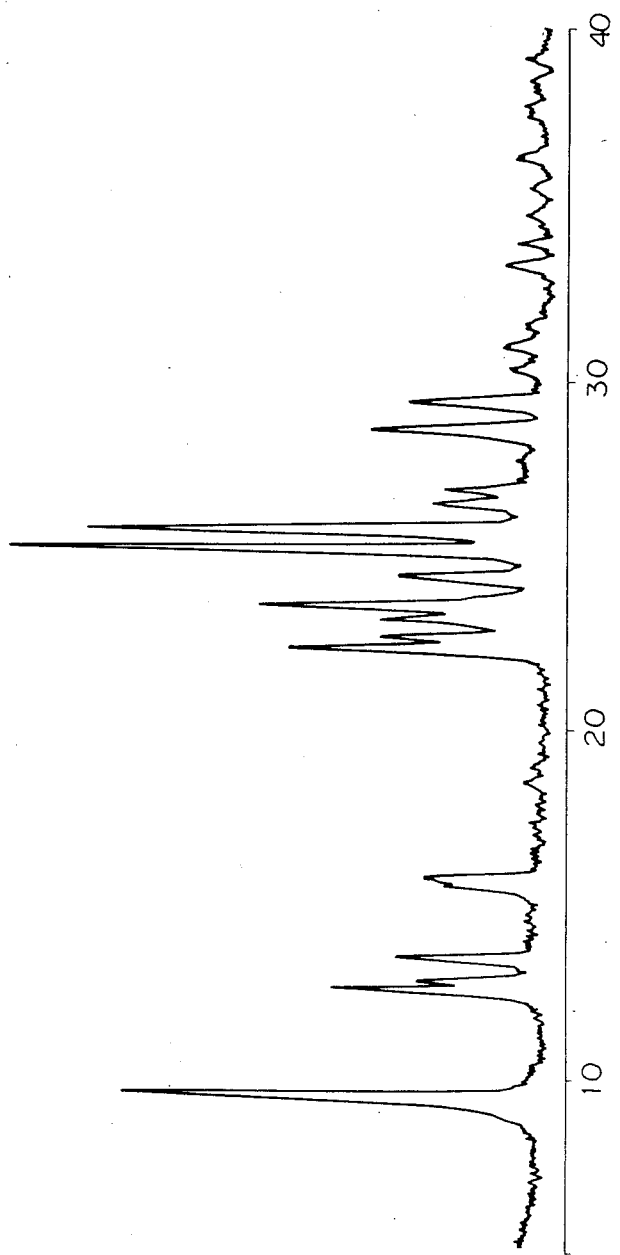
FIG. 2 is an X-ray powder diffraction diagram of the ferrierite type zeolite obtained in Example 5.
Figure 3:
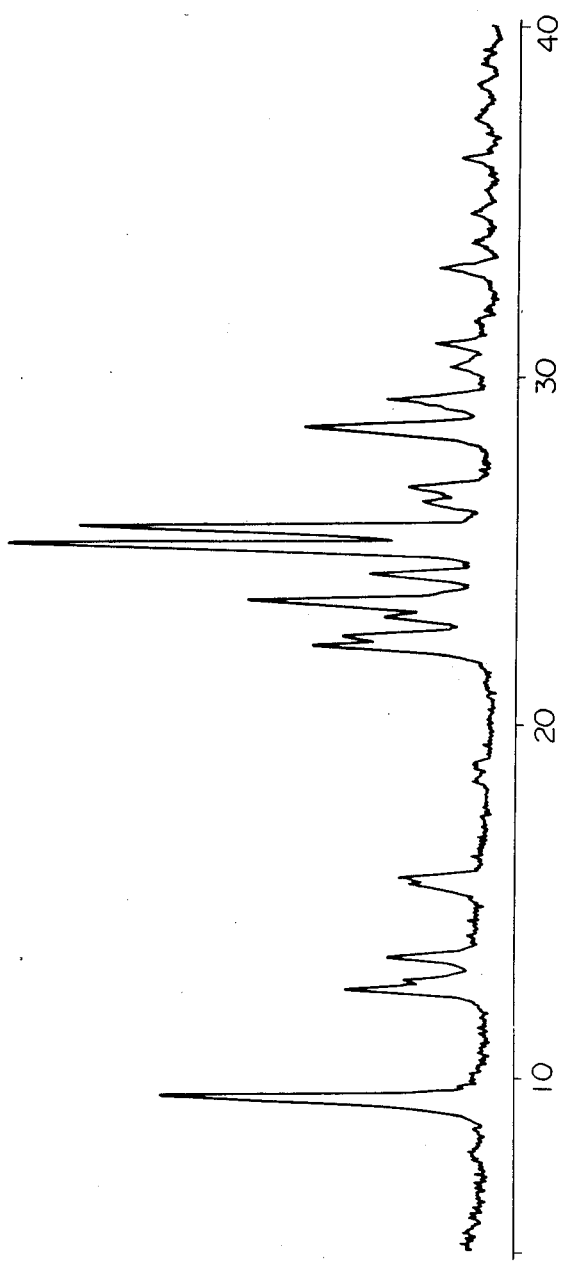
FIG. 3 is an X-ray powder diffraction diagram of the ferrierite type zeolited obtained in Example 7.

X-ray diffraction diagrams of the ferrierite type zeolites obtained in Examples 1, 5 and 7 are shown in FIGS. 1, 2 and 3, respectively,

TABLE 1

| Run No. | Aqueous Solution of Sodium Silicate | | | | Aqueous Solution of Aluminum Sulfate | | | Apparent Residence Time (min) | Homogenous Phase Compound of Amorphous Aluminosilicate | | | | Compound No. |
|---|---|---|---|---|---|---|---|---|---|---|---|---|---|
| | SiO$_2$ (g/l) | Na$_2$O (g/l) | Al$_2$O$_3$ (g/l) | Flow rate (1/Hr) | Al$_2$O (g/l) | SO$_4$ (g/l) | Flow Rate (1/Hr) | | Na$_2$O (wt %) (dry base) | Al$_2$O$_3$ (wt %) (dry base) | SiO$_2$ (wt %) (dry base) | H$_2$O (wt %) (wet base) | |
| 1 | 150 | 48.7 | 0.69 | 21.1 | 52.3 | 250 | 5.3 | 12.5 | 4.89 | 7.89 | 85.8 | 65.1 | A |
| 2 | " | " | " | " | " | " | " | " | 4.95 | 7.85 | 85.7 | 65.4 | B |
| 3 | " | 48.8 | 0.82 | 8.8 | 47.7 | 299 | 2.2 | 30 | 5.4 | 7.21 | 83.1 | 59.7 | C |
| 4 | " | 48.3 | 0.77 | 17.6 | 41.2 | 257 | 4.4 | 15 | 4.05 | 6.35 | 87.5 | 67.6 | D |
| 5 | " | " | " | 8.8 | 30.9 | 267 | 2.2 | 30 | 3.59 | 5.11 | 90.0 | 67.7 | E |
| 6 | " | 48.7 | 0.69 | 21.1 | 75.5 | 228 | 5.3 | 12.5 | 6.50 | 10.7 | 80.8 | 62.1 | F |
| 7 | " | 76.0 | " | 17.6 | 124.4 | 352 | 4.4 | 15 | 8.49 | 15.5 | 75.0 | 64.8 | G |
| 8 | " | 49.0 | " | 8.8 | 75.5 | 230 | 2.2 | 30 | 6.35 | 10.9 | 83.6 | 67.4 | H |

TABLE 2

| Run No. | Homogenous Compound | | Aqueous Solution of Potassium Chloride | | Homogenous Phase Compound of Potassium Ion-Exchanged Amorphous Aluminosilicate | | | | | Compound No. |
|---|---|---|---|---|---|---|---|---|---|---|
| | No. | A-mount (g) | KCl Concentration (wt %) | Amount (g) | K$_2$O (wt %) (dry base) | Na$_2$O (wt %) (dry base) | Al$_2$O$_3$ (wt %) (dry base) | SiO$_2$ (wt %) (dry base) | H$_2$O (wt %) (wet base) | |
| 1 | H | 964 | 16.9 | 1203 | 8.45 | 0.48 | 10.2 | 79.0 | 65.8 | I |
| 2 | C | 990 | 16.6 | 1180 | 7.08 | 0.58 | 7.47 | 85.6 | 61.5 | J |
| 3 | G | 924 | 16.9 | 1204 | 11.35 | 0.72 | 14.81 | 72.4 | 65.5 | K |

TABLE 3

| | Homogenous Compound | | Aqueous Solution of Alkali Metal Hydroxide | | | Capacity (l) of Auto Clave | Crystallization Conditions | | Product (wt %, dry base) (lower value indicates molar ratio) | | | | Determination by X-Ray Diffractometry |
|---|---|---|---|---|---|---|---|---|---|---|---|---|---|
| | No. | A-mount (g) | NaOH (wt %) | KOH (wt %) | A-mount (g) | | Temperature (°C.) | Time (Hrs) | K$_2$O | Na$_2$O | Al$_2$O$_3$ | SiO$_2$ | |
| Example 1 | A | 3658 | 0 | 1.76 | 4348 | 10 | 170 | 48 | 5.29 0.702 | 1.54 0.310 | 8.16 1 | 82.2 17.1 | Ferrierite type zeolite |
| Example 2 | B | 615 | 0.50 | 2.21 | 785 | 2 | 170 | 72 | 5.95 0.722 | 1.29 0.238 | 8.92 1 | 83.0 15.8 | Ferrierite type zeolite |
| Example 3 | C | 557 | 0.28 | 0.77 | 843 | 2 | 180 | 72 | 2.68 0.366 | 3.12 0.647 | 7.93 1 | 85.2 18.2 | Ferrierite type zeolite |
| Example 4 | D | 3884 | 0.75 | 2.19 | 4222 | 10 | 170 | 72 | 5.41 0.797 | 0.824 0.184 | 7.35 1 | 84.0 19.4 | Ferrierite type zeolite |
| Example 5 | E | 659 | 1.27 | 2.45 | 741 | 2 | 160 | 72 | 5.20 0.905 | 0.786 0.208 | 6.22 1 | 86.1 23.5 | Ferrierite type zeolite |
| Example 6 | F | 615 | 0 | 1.70 | 782 | 2 | 180 | 72 | 5.08 0.500 | 3.40 0.508 | 11.0 1 | 79.2 12.2 | Ferrierite type zeolite |
| Example 7 | I | 699 | 1.48 | 0 | 701 | 2 | 180 | 72 | 8.10 0.804 | 1.28 0.193 | 10.9 1 | 77.2 12.0 | Ferrierite type zeolite |
| Comparative Example 1 | J | 593 | 0 | 1.37 | 807 | 2 | 180 | 72 | — | — | — | — | Amorphous |
| Comparative Example 2 | C | 547 | 1.44 | 3.10 | 853 | 2 | 180 | 72 | — | — | — | — | Mordenite type zeolite |
| Comparative Example 3 | G K | 398 336 | 0.04 | 0 | 666 | 2 | 180 | 72 | — | — | — | — | Amorphous |

We claim:

1. A process for preparing ferrierite type zeolites, which comprises the steps of:
    (1) supplying an aqueous alkali metal silicate solution simultaneaously and continuously with an aqueous aluminum-containing solution at substantially constant rates to a reactor while a reaction slurry having the reaction product suspended therein is continuously withdrawn therefrom so that the residence time of the reaction slurry in the reactor is at least three minutes and the pH of the reaction slurry is maintained at a value of 5 to 9, thereby to obtain a homogeneous phase compound of a granular amorphous aluminosilicate having a particle size of 1 to 500 μm and containing aluminum in an amount of 3 to 14% by weight as calculated as anhydrous Al$_2$O$_3$ and an alkali metal in an amount of 1 to 17% by weight as calculated as anhydrous A$_2$O wherein A is a metal selected from the group consisting of sodium and potassium; and thereafter
    (2) crystallizing the homogeneous phase compound of the granular amorphous aluminosilicate at a temperature of 100° to 300° C. in the form of a slurry in water or in an aqueous solution containing up to 13% by weight of sodium hydroxide or a mixture of sodium hydroxide and potassium hydroxide; the molar ratio of potassium ions (K$^+$) to the total alkali metal cations (K$^+$+Na$^+$) in said slurry being in the range of from 0.2 to 0.7; the molar ratio of the total alkali metal hydroxide component as AOH (where A is alkali metal) in the slurry to the silicon component as SiO$_2$ in the homogeneous phase compound is in the range of from 0.1 to 0.35; and the weight ratio of the total solids to the slurry for crystallization is in the range of 0.04 to 0.4.

2. A process according to claim 1, wherein the aluminum-containing aqueous solution is a solution of at least one aluminum compound selected from the group consisting of aluminum sulfate, aluminum nitrate, aluminum chloride sodium aluminate and potassium aluminate.

3. A process according to claim 1, wherein the alkali metal silicate is selected from the group consisting of sodium silicate and potassium silicate.

4. A process according to claim 1, wherein the homogeneous phase compound of the granular amorphous aluminosilicate is ion-exchanged in an aqueous solution containing an alkali metal ion selected from the group consisting of a sodium ion and a potassium ion, before the crystallization.

5. A process according to claim 1, wherein the content of aluminum in the homogeneous phase compound of the granular amorphous compound is 4 to 12% by weight as calculated as anhydrous $Al_2O_3$.

6. A process according to claim 1, wherein the content of the alkali metal in the homogeneous phase compound of the granular amorphous compound is 1.5 to 15% by weight as calculated as anhydrous $A_2O$.

7. A process according to claim 5, wherein the aqueous solution of sodium hydroxide or a mixture of sodium hydroxide and potassium hydroxide has a concentration of up to 11% by weight.

* * * * *